US009153834B2

(12) United States Patent
Haltiner, Jr. et al.

(10) Patent No.: US 9,153,834 B2
(45) Date of Patent: Oct. 6, 2015

(54) FUEL CELL STACK ASSEMBLY WITH PRESSURE BALANCED LOAD MECHANISM

(75) Inventors: Karl Jacob Haltiner, Jr., Fairport, NY (US); Charles Joseph Badura, Penfield, NY (US)

(73) Assignee: Delphi Technologies, Inc., Troy, MI (US)

( * ) Notice: Subject to any disclaimer, the term of this patent is extended or adjusted under 35 U.S.C. 154(b) by 724 days.

(21) Appl. No.: 13/301,023

(22) Filed: Nov. 21, 2011

(65) Prior Publication Data
US 2013/0130148 A1 May 23, 2013

(51) Int. Cl.
*H01M 8/24* (2006.01)

(52) U.S. Cl.
CPC ............ *H01M 8/248* (2013.01); *H01M 8/2475* (2013.01); *H01M 8/242* (2013.01); *Y02E 60/50* (2013.01)

(58) Field of Classification Search
CPC .... H01M 2/248; H01M 2/242; H01M 2/2475
See application file for complete search history.

(56) References Cited

U.S. PATENT DOCUMENTS

| 4,317,864 A | 3/1982 | Strasser |
| 4,973,531 A * | 11/1990 | Zaima et al. ................... 429/470 |
| 5,824,199 A | 10/1998 | Simmons et al. |
| 6,258,475 B1 | 7/2001 | Sugita et al. |
| 7,001,685 B2 | 2/2006 | Bobrov et al. |
| 7,241,523 B1 * | 7/2007 | Arikara et al. ................. 429/410 |
| 2003/0235723 A1 | 12/2003 | Simpkins et al. |
| 2004/0265659 A1 | 12/2004 | Richardson et al. |
| 2008/0090140 A1 * | 4/2008 | Dalton et al. .................. 429/160 |
| 2010/0233564 A1 | 9/2010 | Haltiner, Jr. et al. |
| 2011/0091786 A1 | 4/2011 | Matsumoto et al. |

FOREIGN PATENT DOCUMENTS

| EP | 0575178 A1 | 12/1993 |
| WO | 2010108530 A1 | 9/2010 |

OTHER PUBLICATIONS

Partial European Search Report dated Mar. 21, 2013.

* cited by examiner

*Primary Examiner* — Helen O Conley
(74) *Attorney, Agent, or Firm* — Robert J. Myers (57) ABSTRACT

A fuel cell stack assembly includes a fuel cell stack wherein a plurality of fuel cell cassettes is coupled together by a joining material. A spring strap is coupled to the fuel cell stack in a manner effective to apply a first compressive force to the fuel cell stack. A first load distribution plate is located intermediate the fuel cell stack and the spring strap. The first load distribution plate is configured to distribute the first compressive force over the fuel cell stack in a manner effective to normalize the first compressive force on the joining material. A diaphragm is configured to define a cavity and is configured to apply a second compressive force to the fuel cell stack dependent on a cavity pressure of oxidant within the cavity. The cavity pressure is dependent upon an oxidant pressure of oxidant provided to the fuel cell stack.

13 Claims, 10 Drawing Sheets

FUEL CELL STACK ASSEMBLY WITH PRESSURE BALANCED LOAD MECHANISM

TECHNICAL FIELD OF INVENTION

The invention generally relates to a fuel cell stack assembly, and more particularly relates to a fuel cell stack assembly including a device configured to apply a compressive force on a fuel cell stack.

BACKGROUND OF INVENTION

Fuel cells are used to produce electricity when supplied with fuels containing hydrogen and an oxidant such as air. A typical fuel cell includes an ion conductive electrolyte layer sandwiched between an anode layer and a cathode layer. There are several different types of fuel cells known in the art; amongst these are solid oxide fuel cells (SOFC), polymer electrolyte membrane (PEM) fuel cells, and molten carbonate fuel cells. Fuel cells are regarded as highly efficient electrical power generators that produce high power density with fuel flexibility.

In a typical fuel cell, air is passed over the surface of the cathode layer and a fuel containing hydrogen is passed over the surface of the anode layer opposite that of the cathode layer. Oxygen ions from the air migrate from the cathode layer through the dense electrolyte to the anode layer in which it reacts with the hydrogen and CO in the fuel, forming water and $CO_2$ and thereby creating an electrical potential between the anode layer and the cathode layer of about 1 volt. The fuel cells are typically stacked in series to provide higher voltages.

Each individual fuel cell may be mounted within a metal frame, referred to in the art as a retainer, to form a cell retainer frame assembly. The individual cell retainer frame assembly may then be joined to a metal separator plate, also known in the art as an interconnector plate, to form a fuel cell cassette. The cassettes may be stacked in series with a seal disposed between the sealing surfaces of each cassette to form a fuel cell stack.

Seals for fuel cell stacks require special properties such as a coefficient of thermal expansion comparable to those of the components of the SOFC stacks, a suitable viscosity to fill any gaps in the sealing surfaces of the cassettes, ability to maintain a hermetic seal at operating temperatures of 700° C. to 800° C., good chemical stability, and long term sustainability.

It is known that glass seals can provide sturdy bonded sealing joints between the fuel cell cassettes. However, when the fuel cell stack is cooled to room temperature (about 23° C.) from its typical operating temperature (about 700° C. to 800° C. for SOFC), residual stresses induced by a temperature gradient and/or a mismatch in the thermal coefficient of expansion (TCE) of different materials within the fuel cell cassettes may cause tensile stresses within the glass seals that may exceed the tensile strength of the joint, causing failure of the seals. Tensile stresses may also be formed by internal gas pressures within the fuel cell stack.

Since the glass seals are much stronger in compression than in tension, it has been determined that it is desirable to maintain a compressive force on the fuel cell stack (and thus on the glass seals) at all times, i.e. during operating and non-operating conditions. This may be accomplished with an end plate held in place with bolts that are torqued to provide a compressive force. However, due to the potentially large difference between the fuel cell stack operating temperature and room temperature, even a relatively small difference in the coefficient of thermal expansion between the bolts and the fuel cell stack may result in either an excessively high compressive force or no compressive force at all.

Previous approaches for providing compressive forces to fuel cell stacks using high temperature spring assemblies have been disclosed (U.S. Pat. No. 7,001,705 and US Pat Pub 2010/0233566). High temperature spring assemblies have proven to be an effective solution in fuel cell stacks with a smaller footprint (approximately 100 $cm^2$ active area); however they may become impractical for fuel cell stacks with a larger footprint (approximately 400 $cm^2$ active area). The spring assemblies need to exert considerably higher compressive forces to overcome tensile forces created by pressures within the large footprint fuel cell stacks during operation. The high temperature alloy components required may become prohibitively expensive. In addition, it may be much more difficult to apply the compressive force uniformly over the larger planer area which leads to increased complexity further increasing the cost of this type of loading mechanism.

Another approach using a bladder for providing compressive forces to a fuel cell stack has been disclosed (U.S. Pat. No. 6,258,475) which includes a fluid-filled pressurized bladder and a spring assembly. The spring assembly applies a first compressive force to a first load distribution plate while the bladder applies a second compressive force to a second load distribution plate. The flexible bladder and the fluid within the bladder must be configured to withstand the high temperatures generated by the fuel cell stack. These high temperature materials are generally quite expensive. In addition, a mechanism must be provided to pressurize the fluid within the bladder and to regulate the pressure within the bladder which leads to increased complexity further increasing the cost of this type of loading mechanism. Therefore, a simpler, lower cost device to apply a compressive force to a fuel cell stack is desired.

SUMMARY OF THE INVENTION

In accordance with one embodiment of this invention, a fuel cell stack assembly is provided. The fuel cell stack assembly includes a fuel cell stack including a plurality of fuel cells coupled together by a joining material. The fuel cell stack assembly also includes a spring strap coupled to the fuel cell stack in a manner effective to apply a first compressive force to the fuel cell stack. The fuel cell stack assembly further includes a first load distribution plate located intermediate the fuel cell stack and the spring strap. The first load distribution plate is configured to distribute the first compressive force over the fuel cell stack in a manner effective to normalize the first compressive force on the joining material. The fuel cell stack additionally includes a diaphragm configured to define a cavity and configured to apply a second compressive force to the fuel cell stack dependent on a cavity pressure of oxidant within the cavity. The cavity pressure is dependent upon an oxidant pressure of oxidant provided to the fuel cell stack.

In another embodiment of the present invention, the cavity pressure may be proportional to a cathode manifold pressure.

In another embodiment of the present invention, the cavity pressure may be proportional to an oxidant supply blower pressure.

In another embodiment of the present invention, a spring portion of the spring strap may be in contact with a contact surface of the first load distribution plate. A curved shape of the contact surface may be selected so that the spring portion exhibits substantially uniform bending stress. The curved shape may be configured to define a convex curve. The convex curve may have a constant radius.

In another embodiment of the present invention, the first load distribution plate may be configured to define the cavity. The diaphragm may be disposed intermediate to the cavity and the fuel cell stack. The first load distribution plate may include a support structure configured to support the diaphragm when the diaphragm is in a relaxed state. The first load distribution plate may define the support structure. The diaphragm may be hermetically sealed to the first load distribution plate. The diaphragm may be configured to distribute the second compressive force over the fuel cell stack in a manner effective to normalize the second compressive force on the joining material. The diaphragm may be formed of sheet metal. The diaphragm may be metallically bonded to said first load distribution plate.

In another embodiment of the present invention, the spring strap may be configured to be rigidly coupled to an end plate. The spring portion may be substantially flat before the spring strap is coupled to an end plate. The spring portion may conform to a curved surface of the first load distribution plate when the spring strap is coupled to an end plate.

In yet another embodiment of the present invention, a first load distribution plate assembly is provided. The first load distribution plate assembly is configured for use in a fuel cell stack assembly. The first load distribution plate includes a first load distribution plate configured to distribute a first compressive force over a fuel cell stack in a manner effective to normalize the first compressive force on a joining material coupling a plurality of fuel cells within the fuel cell stack. The first load distribution plate further includes a diaphragm configured to define a cavity and configured to apply a second compressive force to the fuel cell stack dependent upon a cavity pressure of fuel within the cavity, wherein the cavity pressure is dependent upon a fuel supply pressure of fuel provided to the fuel cell stack.

Further features and advantages of the invention will appear more clearly on a reading of the following detailed description of the preferred embodiment of the invention, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION OF INVENTION

It may be desirable to maintain a compressive force on a fuel cell stack at all times, that is during operating and non-operating conditions, to keep seals between the fuel cells in the fuel cell stack from developing tensile stresses that may rupture the seals. A first compressive force may be applied by a passive device, such as a spring strap, that is capable of maintaining the first compressive load at all times. The first compressive force may prevent tensile forces from developing in the seals due to thermal expansion and contraction when the fuel cell stack is not operational. A second compressive force may be applied by an active device that operates when the fuel cell stack is operational, such as a diaphragm that is pressurized by an oxidant that is supplied under pressure to the fuel cell stack. The second compressive force may prevent tensile forces from developing in the seals due to internal pressure within the fuel cell stack caused by a pressurized fuel and the pressured oxidant when it is operating.

Figure 1:
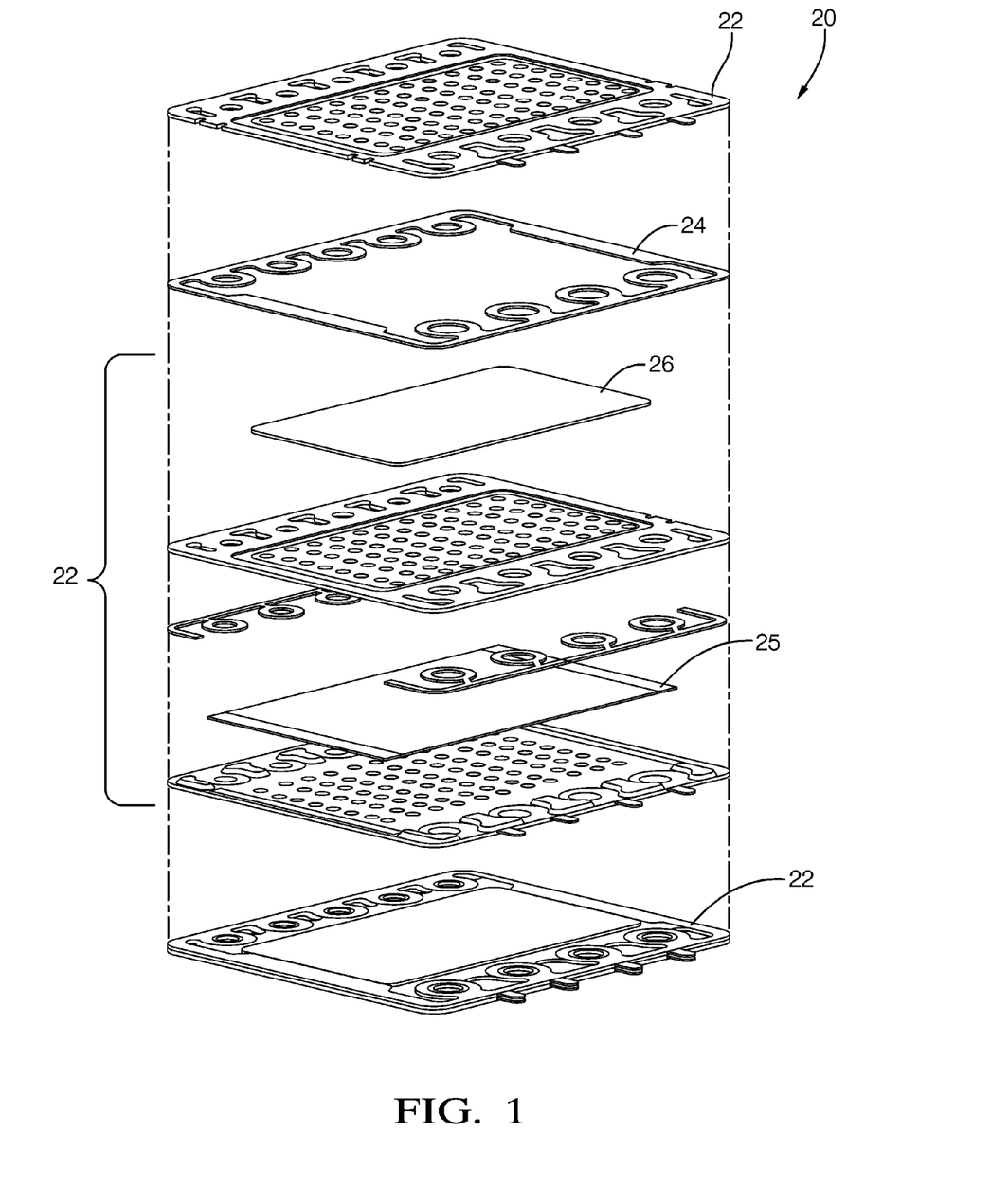
FIG. 1 is an illustration of an exploded perspective view of a fuel cell stack in accordance with one embodiment.

FIG. 1 illustrates a non-limiting example of a fuel cell stack 20. The fuel cell stack 20 includes a plurality of fuel cell cassettes 22 coupled together by a joining material 24 forming a seal between the plurality of fuel cell cassettes 22. The joining material 24 may be a glass seal material such as an alkaline earth aluminosilicate glass. The joining material 24 may be heat treated to form a bonded joint to provide a gas-tight seal to separate and contain the pressurized fuel and the pressured oxidant. The plurality of fuel cell cassettes 22 also includes interconnector plates 25 and electrical interconnections 26 configured to provide electrical connections between the fuel cell cassettes 22 within the fuel cell stack 20. For further detail regarding the joining material 24 and seals between the plurality of fuel cell cassettes 22, please refer to US Pat Pub 2006/063057.

Figure 2:
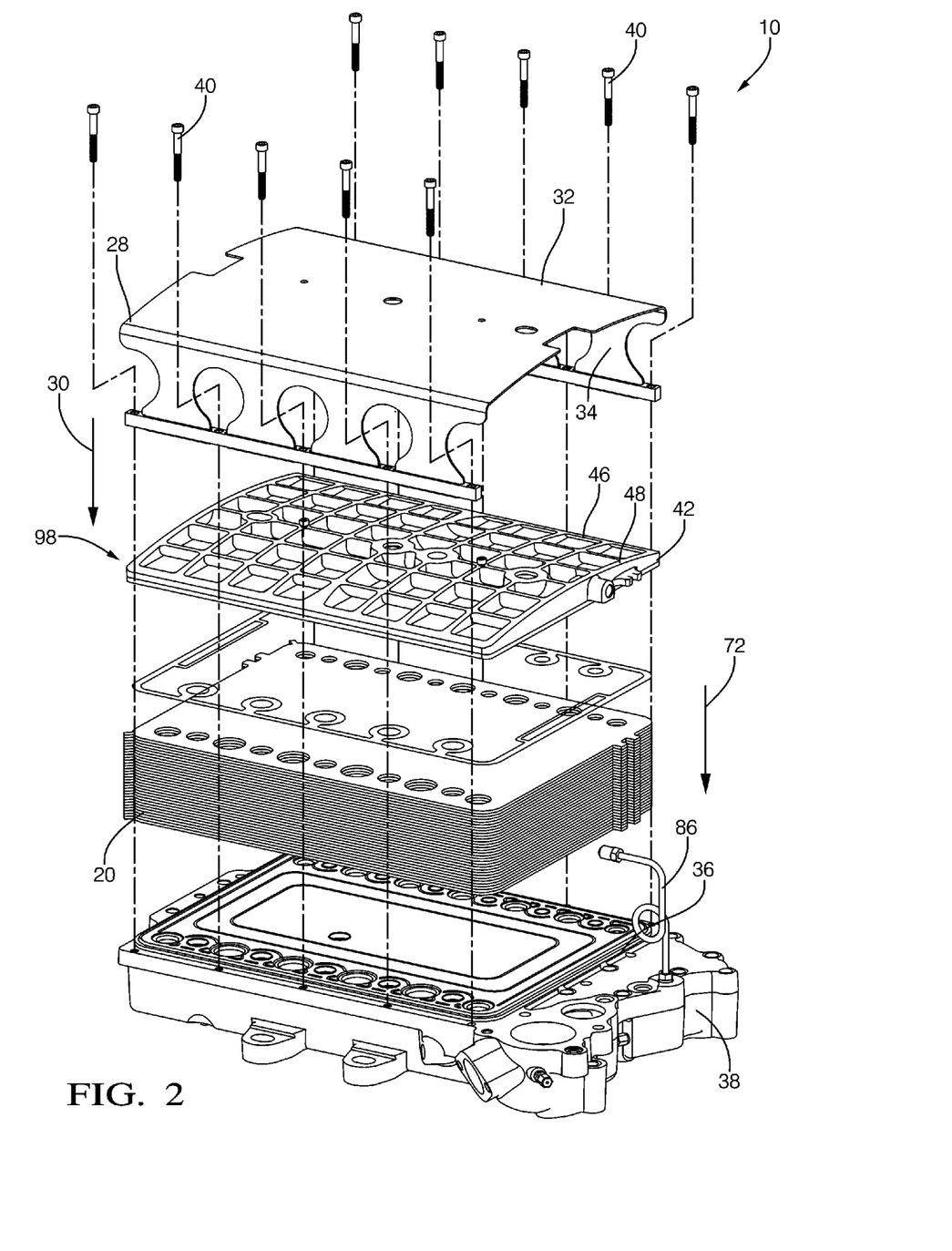
FIG. 2 is an illustration of an exploded perspective view of a fuel cell stack assembly in accordance with one embodiment.

FIG. 2 illustrates a non-limiting example of a fuel cell stack assembly 10. In addition to the fuel cell stack 20, the fuel cell stack assembly 10 further includes a spring strap 28 coupled to the fuel cell stack 20 in a manner effective to apply a first compressive force 30 to the fuel cell stack 20. The spring strap 28 is configured to maintain the first compressive force 30 on the fuel cell stack 20 (and thus on the joining material 24) at all times, i.e. during operating and non-operating conditions. The spring strap 28 includes a spring portion 32 and an attachment portion 34. The spring strap 28 may be configured to be rigidly coupled to an end plate 36 via the attachment portion 34. In a non-limiting example, the end plate 36 may be incorporated into a cathode oxidant manifold 38 and the attachment portion 34 of the spring strap 28 may be coupled to the end plate 36 by a plurality of threaded fasteners 40. The spring strap 28 is configured so that the spring portion 32 of the spring strap 28 exhibits bending stress when incorporated in the fuel cell stack assembly 10.

The spring strap 28 material is selected to accommodate the operating temperatures of the fuel cell stack assembly 10 with an emphasis on strength, corrosion resistance, and thermal stress creep resistance. In a non-limiting example, the spring strap 28 may be formed of a high temperature, high strength austenitic stainless steel, such as Society of Automotive Engineers (SAE) 316 grade stainless steel or ATI 20-25+ Nb manufactured by ATI Allegheny Ludlum Corporation, 100 River Road, Brackenridge, Pa. 15014. The spring strap 28 may alternately be formed of a high temperature nickel-chromium alloy, such as INCONEL 625 or INCONEL 718 manufactured by Special Metals Corporation, 3200 Riverside Drive, Huntington W. Va. 25725 or HAYNES 230 or HAYNES 263 manufactured by Haynes International, 1020 West Park Ave, Kokomo Ind. 46901.

The fuel cell assembly also includes a first load distribution plate 42 located intermediate to the fuel cell stack 20 and the spring strap 28. The first compressive force 30 is applied by the spring strap 28 to the first load distribution plate 42. The first load distribution plate 42 in turn applies the first compressive force 30 to the fuel cell stack 20. The first load distribution plate 42 is configured to distribute the first compressive force 30 over the fuel cell stack 20 in a manner effective to normalize the first compressive force 30 on the joining material 24. Hereinafter, a normalized compressive force minimizes the variation of compressive force in any point in the adjoining material to ±10%. The first load distribution plate 42 may be formed of less costly materials such as cast iron, ferritic stainless steel, or any other material that is sufficiently resistant to thermal stress creep.

Figure 3:
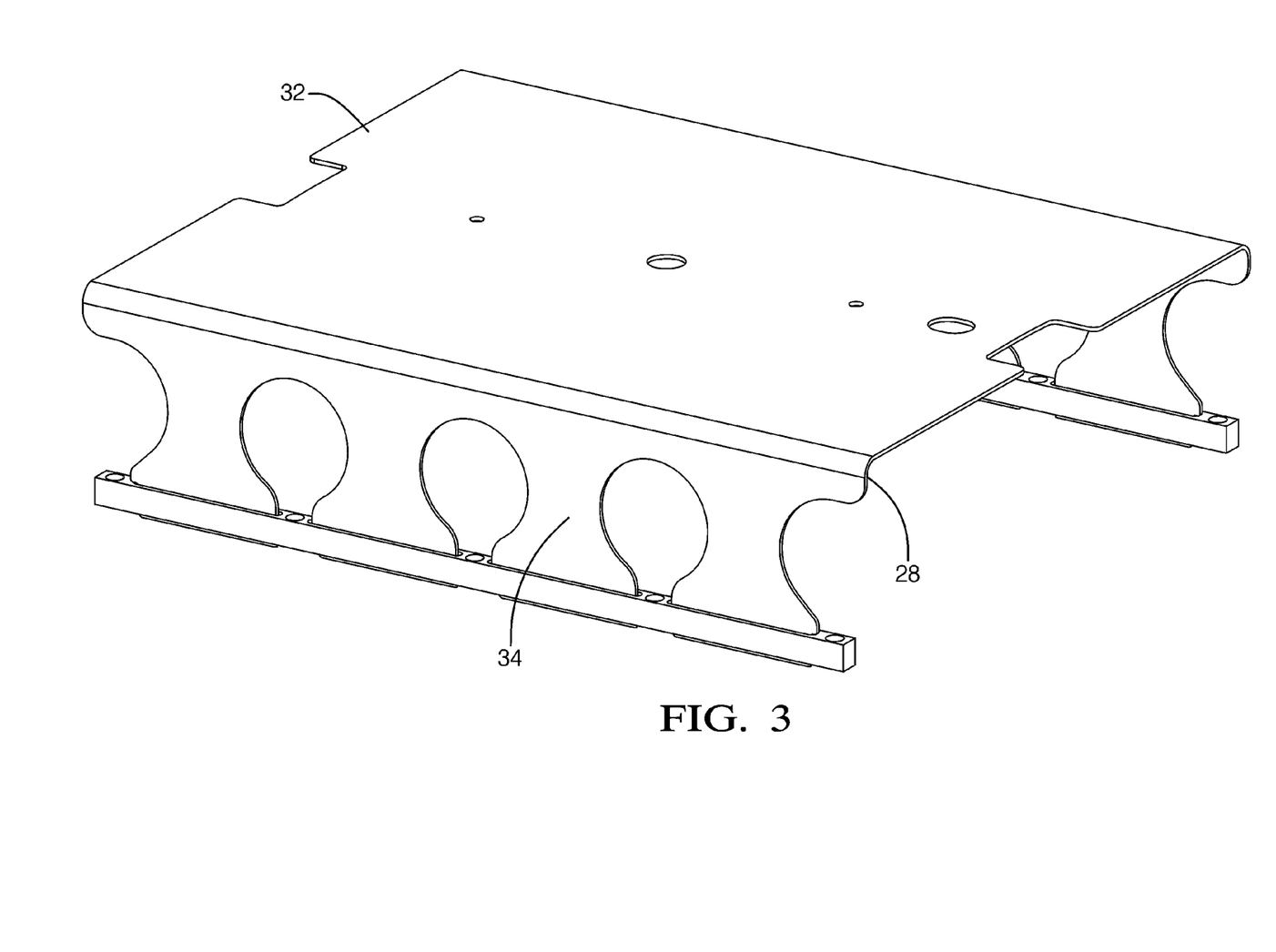
FIG. 3 is an illustration of a perspective view of a spring strap in accordance with one embodiment.

FIG. 3 illustrates a non-limiting example of a spring strap 28 wherein the spring portion 32 may be configured as a plate that is substantially flat prior to the time when it is incorporated into the fuel cell stack assembly 10. As used herein, a substantially flat plate has a flatness variation of less than ±10 millimeters from being absolutely flat.

Referring again to FIG. 2, the spring portion 32 may conform to a contact surface 46 of the first load distribution plate 42 when the spring strap 28 is coupled to the end plate 36, so that the spring portion 32 may be in contact with the contact surface 46 of the first load distribution plate 42. The contact surface 46 may define a convex curve 48 with a constant radius 50 of between 300 millimeters and 3000 millimeters, depending on the width of the first load distribution plate 42. For a first load distribution plate 42 with a width of 250 millimeters, the curve radius may be 650 millimeters. The spring portion 32 bends to conform to the curved surface of the first load distribution plate 42. This bending causes tensile forces within the spring portion 32. The reactive forces of these tensile forces are the first compressive force 30 that is applied to the first load distribution plate 42. As the spring portion 32 is bent over the contact surface 46, it effectively acts as a leaf spring in which the moment arm of the spring becomes shorter and shorter. Thus, the spring portion 32 exhibits substantially uniform bending stress. As used herein, a substantially uniform bending stress has a variation in any point in the adjoining material of ±10%. Since the bending stresses are not concentrated in a particular region of the spring portion 32, the first compressive force 30 can be applied by a relatively thin spring strap 28 with a substantially constant thickness and still keep the bending stresses within the spring strap 28 low enough utilizing a relatively thin (e.g. 0.25 millimeters to 2.5 millimeters) spring strap 28 material. Hereinafter, a substantially constant thickness varies in thickness by less than or equal to 5%. Keeping the bending stresses within the spring strap 28 low may also minimize a decrease in the first compressive force 30 at elevated temperatures due to thermal creep. The spring strap 28 with constant thickness offers an advantage in that it can be fabricated more cheaply than a spring strap that has varying thickness to accommodate higher stress regions.

Since the tensile forces caused by the bending stresses are in general substantially uniformly distributed throughout the spring portion 32, the first compressive force 30 applied to the curved surface of the first load distribution plate 42 may also be substantially uniformly distributed, e.g., not applied at just at the edges. The first load distribution plate 42 may therefore be subject to mainly compressive forces. Accordingly, the first load distribution plate 42 may be formed of less costly materials such as cast iron or ferritic stainless steel since high tensile strength may not be required.

Figure 4:
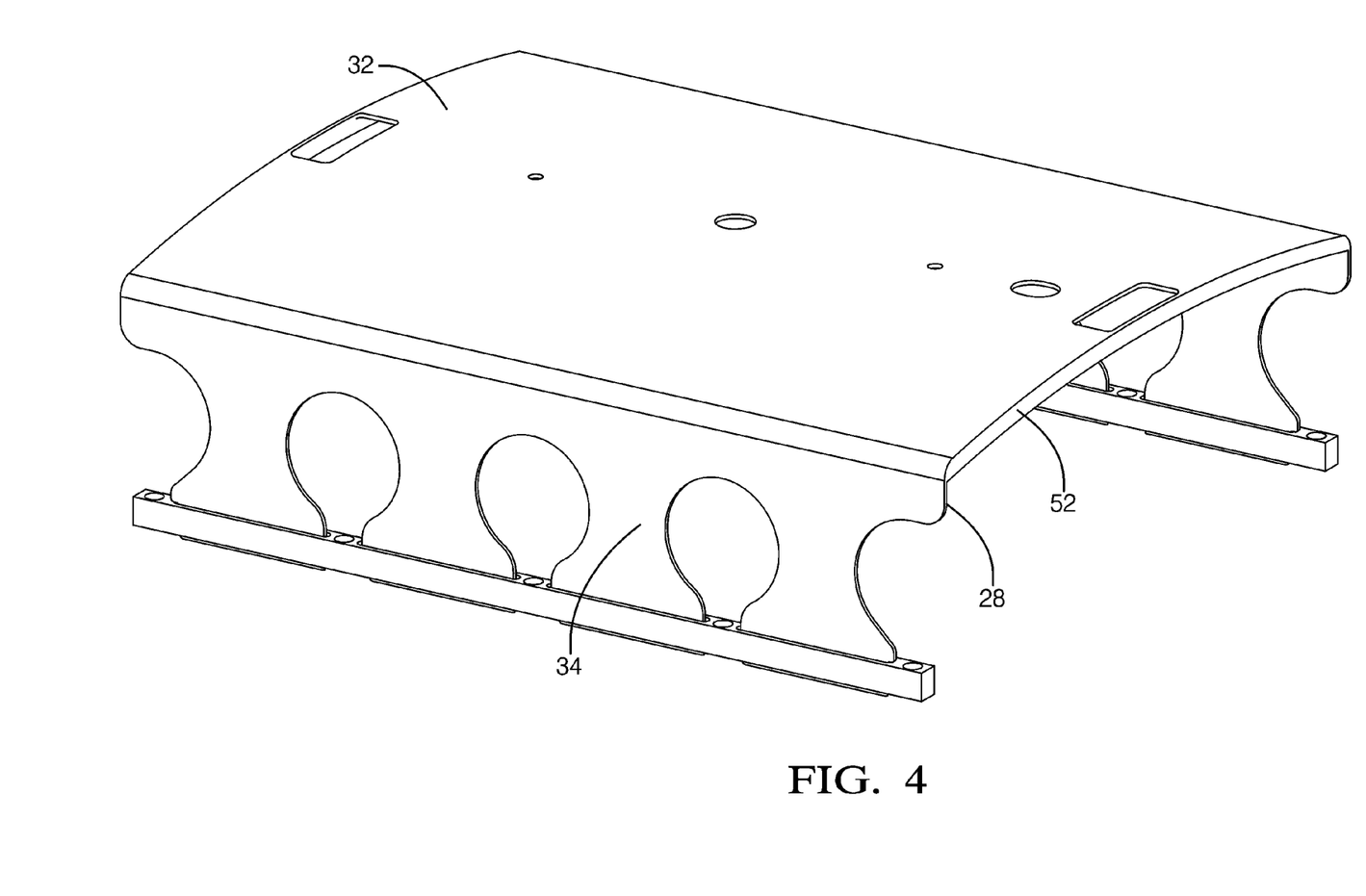
FIG. 4 is an illustration of a perspective view of a spring strap in accordance with a second embodiment.
Figure 5:
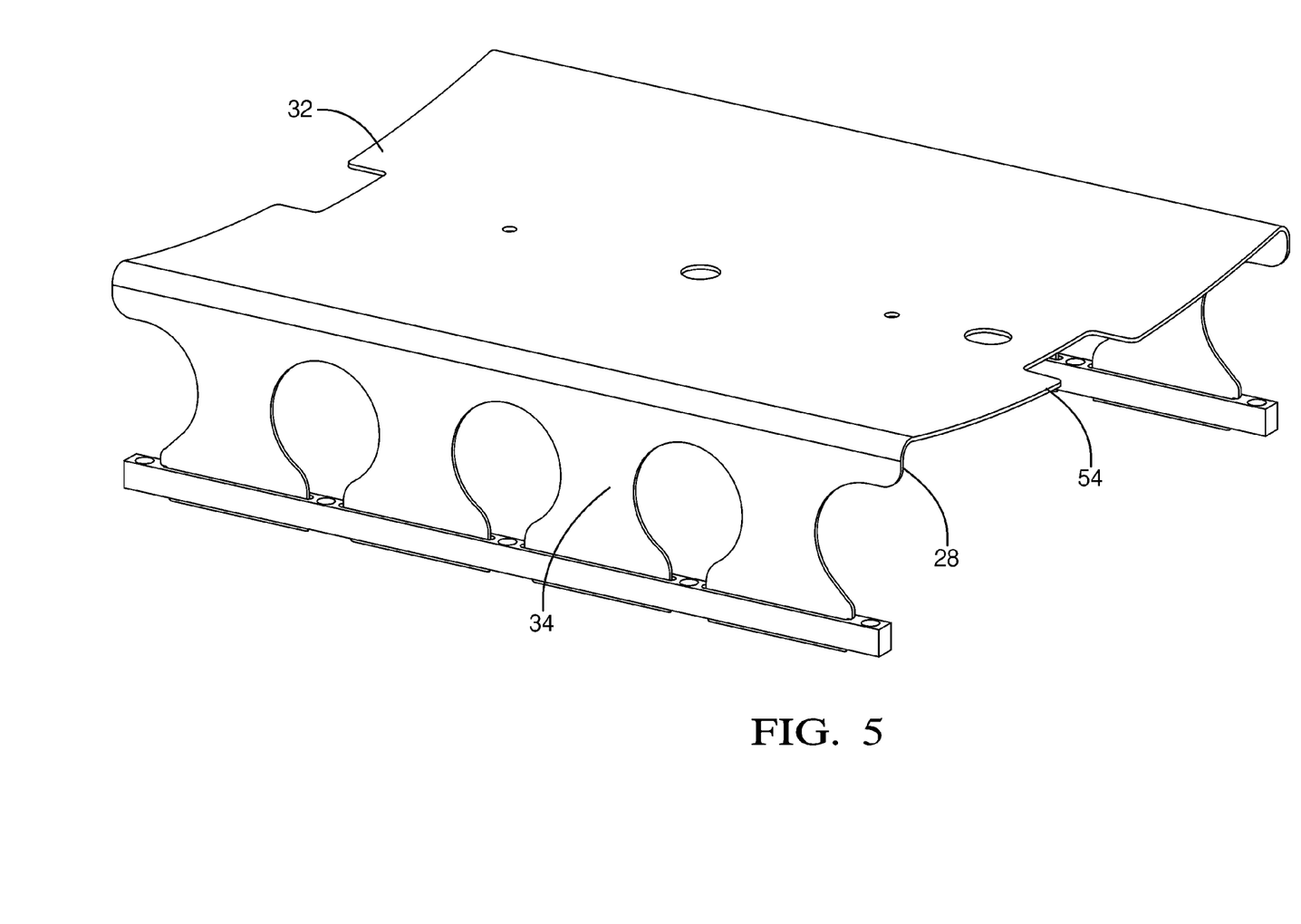
FIG. 5 is an illustration of a perspective view of a spring strap in accordance with a third embodiment.
Figure 6:
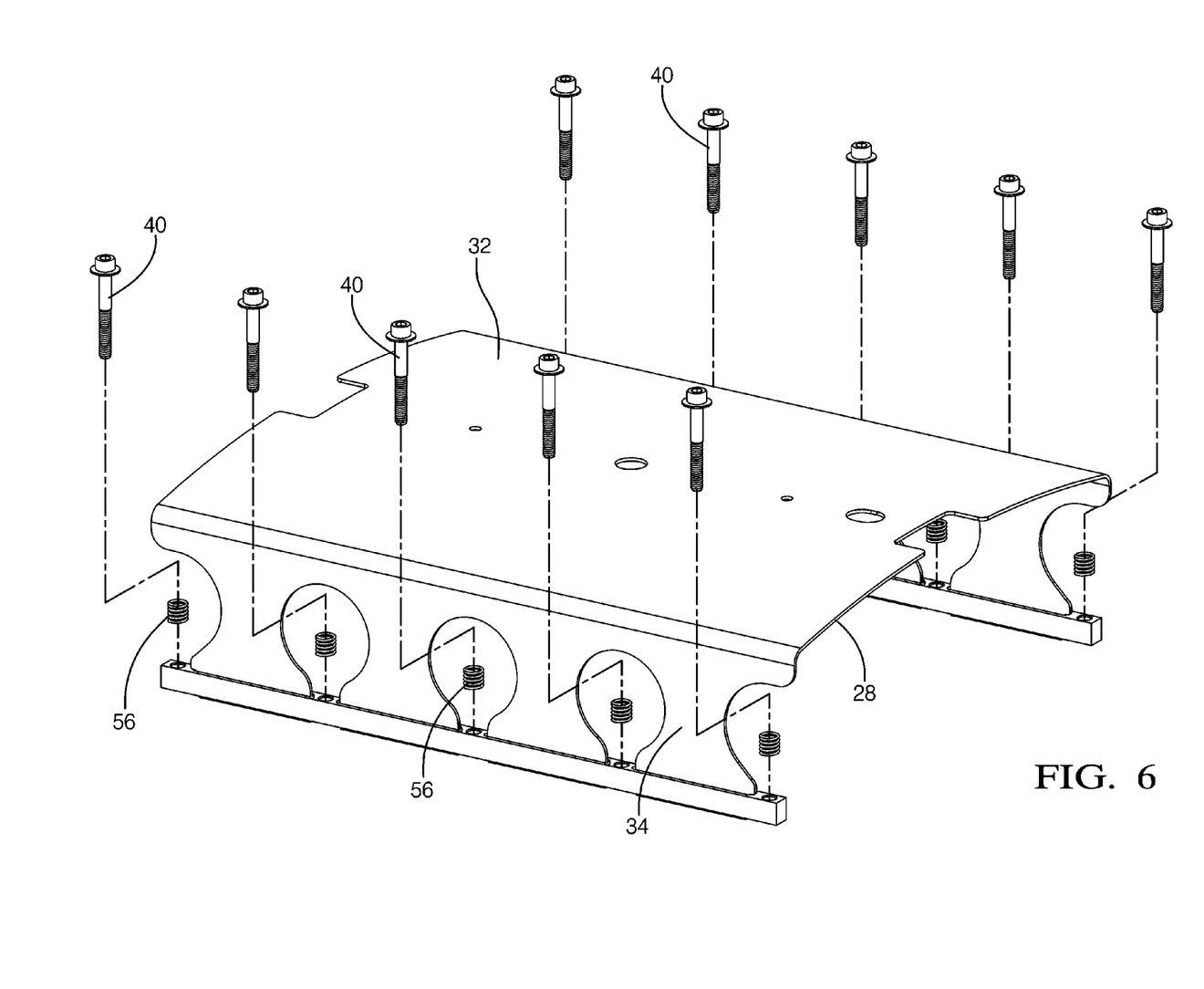
FIG. 6 is an illustration of a perspective view of a spring strap in accordance with a fourth embodiment.

FIGS. 4 through 6 illustrate alternate embodiments of the spring strap 28. Embodiments of the spring strap 28 may be envisioned wherein the spring portion 32 includes an elastomeric spring 52, as shown in FIG. 4, or a leaf spring defining a concave curve 54, as shown in FIG. 5. Alternately, an embodiment of the spring strap 28 may be envisioned wherein the attachment portion 34 may include a compression spring 56 as shown in FIG. 6.

Figure 7:
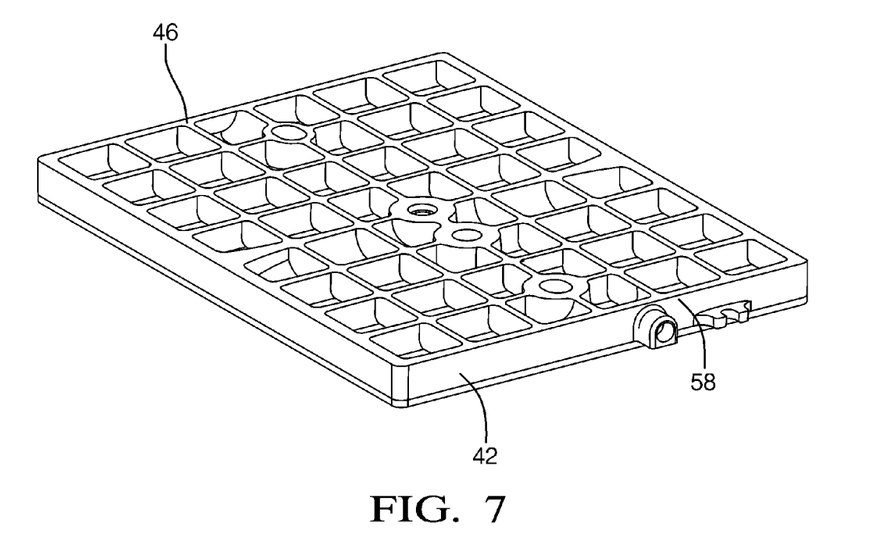
FIG. 7 is an illustration of a perspective view of a load distribution plate in accordance with a second embodiment.
Figure 8:
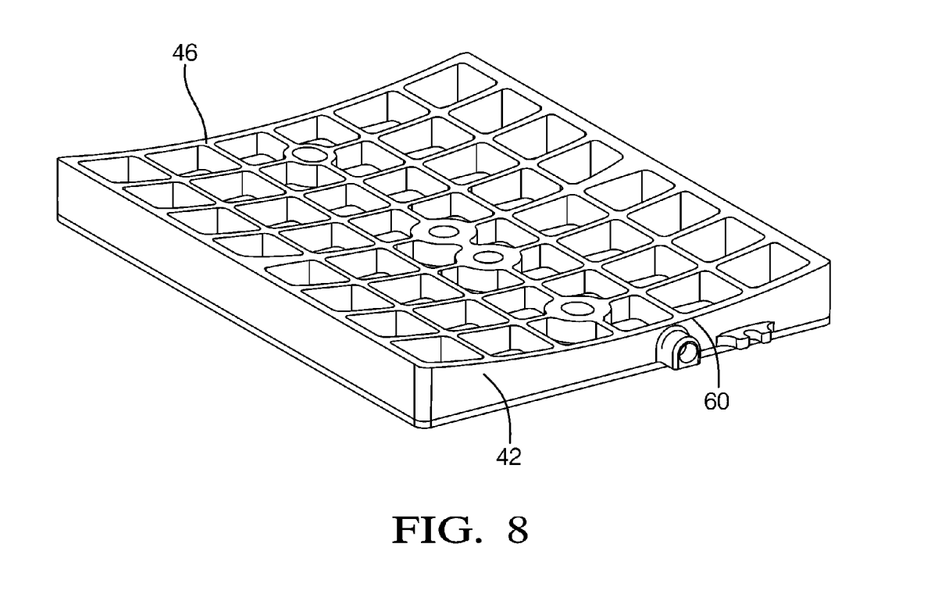
FIG. 8 is an illustration of a perspective view of a load distribution plate in accordance with a third embodiment.

FIGS. 7 and 8 illustrate alternate embodiments of the load distribution plate 42. Embodiments of the first load distribution plate 42 may be envisioned wherein the contact surface 46 of the load distribution plate 42 is a flat surface 58 as shown in FIG. 7 or a concave surface 60 as shown in FIG. 8.

Because the spring strap 28 is drawn snugly over the first load distribution plate 42 there may be no significant movement of the fuel cell stack 20 should it be exposed to high vibration or shock loads. Movement of the fuel cell cassettes 22 within the fuel cell stack 20 may cause the joining material 24 to be exposed to tensile forces which could overstress those joints formed by the joining material 24 and compromise their function.

Figure 9:
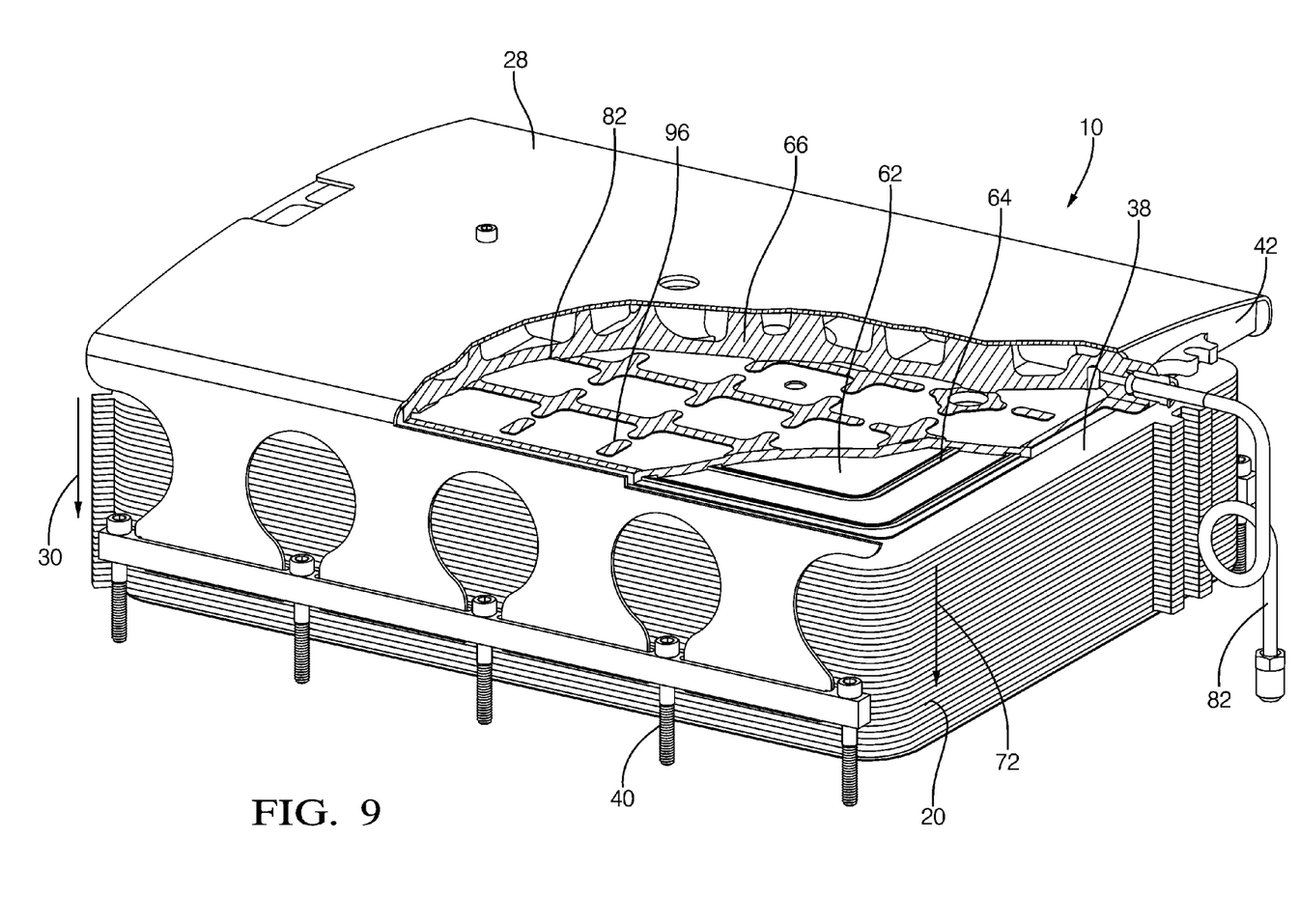
FIG. 9 is an illustration of a partial cut away perspective view of a fuel cell stack assembly in accordance with one embodiment.

Referring now to FIG. 9, the fuel cell stack assembly 10 additionally includes a diaphragm 62 configured to define a cavity 66. The diaphragm 62 may be configured to be easily deformable. The diaphragm 62 may include a convex portion 64 configured to increase the deformability of the diaphragm 62. The convex portion 64 may be disposed on the periphery of the diaphragm 62.

The diaphragm 62 may be formed of sheet metal. The sheet metal may be a high temperature nickel alloy, such as an austenitic stainless steel or a ferritic stainless steel with a corrosion resistant coating. The range of the thickness selected for the diaphragm 62 may be between 0.10 and 1.50 millimeters, depending on the surface area of the diaphragm 62 and the temperature and forces to which the diaphragm 62 will be subjected.

In a non-limiting example, the first load distribution plate 42 may be configured to also define the cavity 66. The diaphragm 62 may define a first cavity boundary 68 while the first load distribution plate 42 may define a second cavity boundary 70. The diaphragm 62 may be disposed intermediate to the cavity 66 and the fuel cell stack 20. The first compressive force 30 is then applied by the first load distribution plate 42 to the diaphragm 62, which in turn applies the first compressive force 30 to the fuel cell stack 20.

The diaphragm 62 may be metallically bonded to the first load distribution plate 42 using processes well known in the art such as welding, soldering, or brazing. The mechanical bonding may hermetically seal the diaphragm 62 to the first load distribution plate 42. The diaphragm 62 is configured to apply a second compressive force 72 to the fuel cell stack 20. The diaphragm 62 may be configured to distribute the second compressive force 72 over the fuel cell stack 20 in a manner effective to normalize the second compressive force 72 on the joining material 24.

The diaphragm 62 may be configured to apply the second compressive force 72 directly to the fuel cell stack 20 as shown in FIG. 9. The diaphragm 62 may have a reduced bending strength at fuel cell operating temperatures if it is formed of thin sheet metal and may conform readily to the top of the fuel cell stack 20 thus applying a substantially uniform second compressive force 72 on the fuel cell stack 20.

Figure 10:
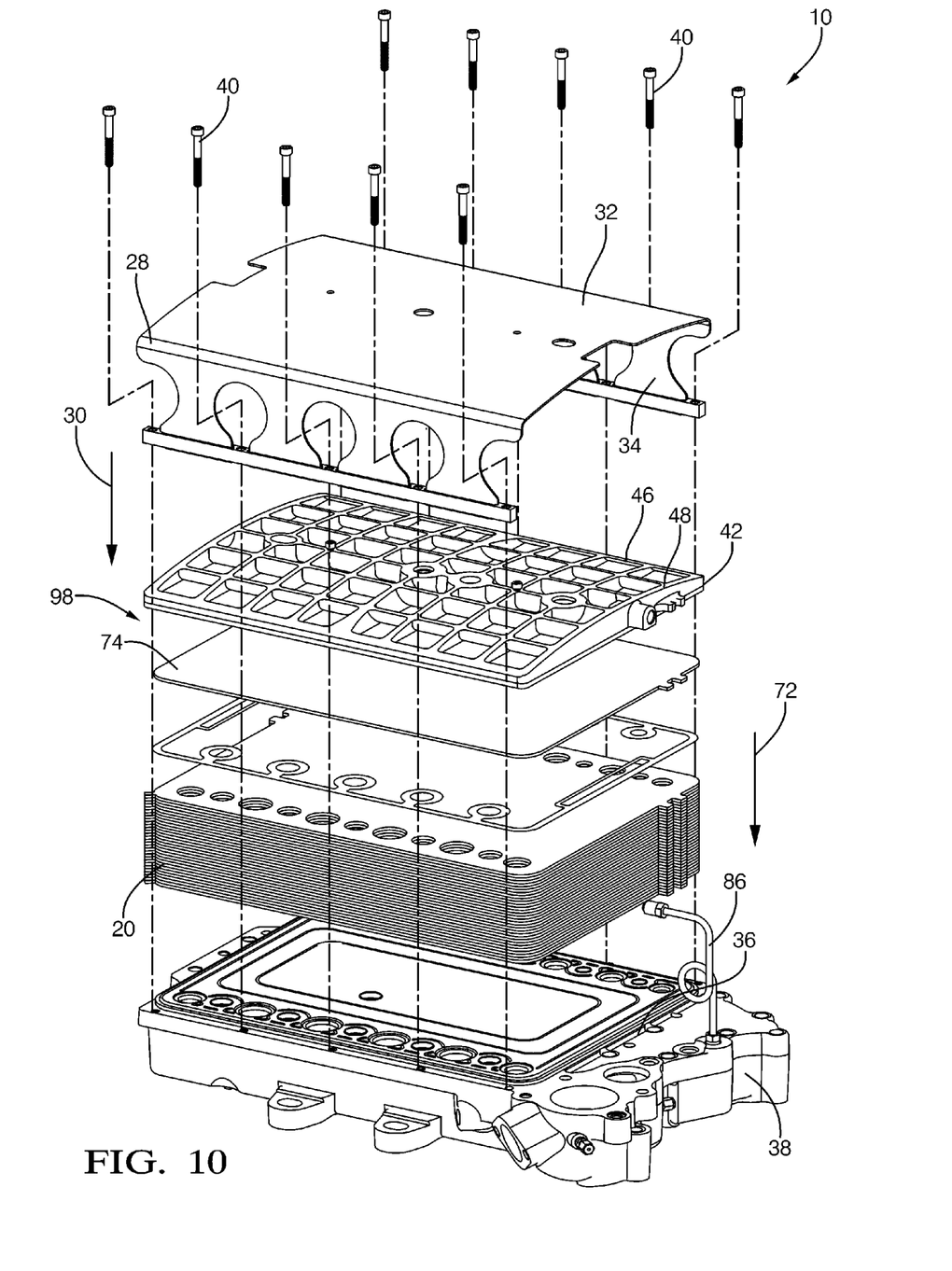
FIG. 10 is an illustration of an exploded perspective view of a fuel cell stack assembly in accordance with a second embodiment.

FIG. 10 illustrates an alternate embodiment of the diaphragm 62 that may be configured to apply the second compressive force 72 to the fuel cell stack 20 through a second load distribution plate 74. In a non-limiting example, the second load distribution plate 74 may be configured to also define the cavity 66. The diaphragm 62 may define the first cavity boundary 68 while the second load distribution plate 74 may define the second cavity boundary 70. The diaphragm 62 may be disposed intermediate to the cavity 66 and the fuel cell stack 20. The first compressive force 30 is then applied by the first load distribution plate 42 to the second load distribution plate 74 which applies the first compressive force 30 to the diaphragm 62, which in turn applies the first compressive force 30 to the fuel cell stack 20. In this case, the diaphragm 62 and second load distribution plate 74 can be fabricated from materials with a matching thermal coefficient of expansion such that the diaphragm 62 does not distort with the large temperature changes from non-operating temperature to operating temperature. The first load distribution plate 42 can then be fabricated from a low cost material with little regard to thermal coefficient of expansion compatibility since it will be decoupled from the diaphragm 62.

Figure 11:
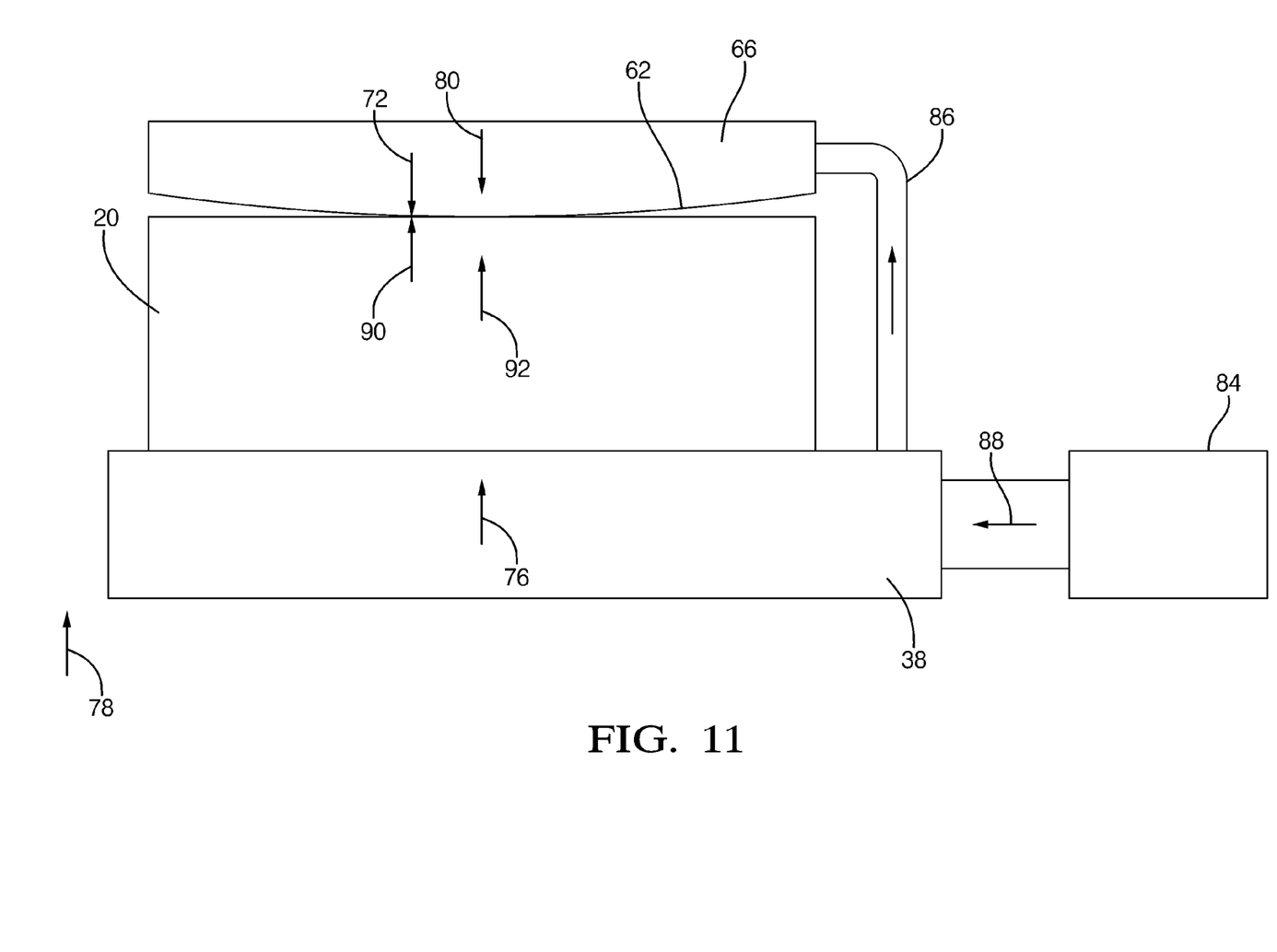
FIG. 11 is an illustration of a schematic view of pressures and forces within a fuel cell stack assembly in accordance with one embodiment.

As shown in FIG. 11, the second compressive force 72 is dependent on a cavity pressure 80. The cavity pressure 80 is dependent upon a cathode oxidant pressure 76 provided to the fuel cell stack 20 during operating conditions. The cathode oxidant pressure 76 is higher than the ambient air pressure 78 of air outside of the fuel cell stack 20 during operating conditions. The cathode oxidant pressure 76 may be provided by an oxidant supply blower 84. The cavity 66 may be in pneumatic communication with a source of cathode oxidant pressure 76 via an oxidant pressure supply conduit 86. The cathode oxidant pressure 76 source may be the oxidant supply blower 84, the cathode oxidant manifold 38, or any other point in the cathode oxidant stream 88 that is upstream of the fuel cell stack 20 such that a pressure applied by the diaphragm 62 is always higher than a tensile force 90 created by an internal pressure 92 within the fuel cell stack 20. Thus, the second compressive force 72 applied by the diaphragm 62 may be greater than the tensile forces within the fuel cell stack 20 caused by the internal pressure 92 within the fuel cell stack 20 during operating conditions. The spring strap 28 also reacts to and resists the load created by the second compressive force 72 against the stack.

The second compressive force 72 is proportional to the cavity pressure 80 and thus may be proportional to the cathode oxidant pressure 76 and the internal pressure 92 within the fuel cell stack 20. Therefore, the second compressive force 72 may vary proportionally with the tensile force 90 without the need for external control of the second compressive force 72. Alternately, the cavity pressure 80 may be regulated in relation to the cathode oxidant pressure 76 to control the second compressive force 72.

Referring again to FIG. 9, the diaphragm 62 may be configured to have a surface area that is larger than an area within the fuel cell stack 20 that is pressurized by fuel and/or oxidant. The convex portion 64 may be disposed in the area of the diaphragm 62 not configured to be in contact with the pressurized area.

When the diaphragm 62 is not supported by the cavity pressure 80, a portion of the first compressive force 30 may be applied to bending the diaphragm 62 rather than compressing the fuel cell stack 20. Therefore, it may be desirable that the fuel cell stack assembly 10 include a support structure 82 configured to support the diaphragm 62 and limit deformation of the diaphragm 62 caused by the first compressive force 30 when the diaphragm 62 is in a relaxed state, i.e. the diaphragm 62 is not supported by the cavity pressure 80. The support structure 82 may define a passage 96 configured to allow the cavity pressure 80 to be exerted on the diaphragm 62. The support structure 82 may be a separate structure within the cavity 66 or the first load distribution plate 42 may define the support structure 82 by being integral to the first load distribution plate 42. Alternately, the second load distribution plate 74, which may be configured to prevent bending of the diaphragm 62 caused by the first compressive force 30, may be disposed intermediate to the diaphragm 62 and fuel cell stack 20.

We refer once more to FIG. 2, which illustrates a non-limiting example of a load distribution plate assembly 98 configured for use in a fuel cell stack assembly 10. The load distribution plate assembly 98 includes a first load distribution plate 42 configured to distribute a first compressive force 30 over a fuel cell stack 20 in a manner effective to normalize the first compressive force 30 on a joining material 24 coupling a plurality of fuel cell cassettes 22 within the fuel cell stack 20.

Referring again to FIG. 9, the load distribution plate assembly 98 further includes a diaphragm 62 configured to define a cavity 66 and configured to apply a second compressive force 72 to the fuel cell stack 20. As shown in FIG. 11, the second compressive force 72 is dependent upon a cavity pressure 80 of oxidant within the cavity 66, wherein the cavity pressure 80 is dependent upon an oxidant pressure of oxidant provided to the fuel cell stack 20.

Accordingly, a fuel cell stack assembly 10 and a load distribution plate 42 for the fuel cell stack assembly 10 is provided. The spring strap 28 is configured to maintain a first compressive force 30 on the fuel cell stack 20 to prevent the joining material 24 between the fuel cell cassettes 22 from experiencing tensile forces that may result from thermal expansion/contraction or vibration. The first compressive force 30 is applied to the fuel cell stack 20 during both operating and non-operating conditions.

The diaphragm 62 is configured to apply a second compressive force 72 that may counteract tensile forces that result from oxidant and fuel pressures within the fuel cell stack 20 during operating conditions. The second compressive force 72 is generated by the cavity pressure 80 that is dependent upon the cathode oxidant pressure 76. Thus, the second compressive force 72 is applied to the fuel cell stack 20 only during operating conditions. Additionally, since the second compressive force 72 is dependent on the cathode oxidant pressure 76, a separate source for providing the cavity pressure 80 may not be required. The spring strap 28 also reacts to and resists the load created by the second compressive force 72 against the stack.

While this invention has been described in terms of the preferred embodiments thereof, it is not intended to be so limited, but rather only to the extent set forth in the claims that follow. Moreover, the use of the terms first, second, etc. does not denote any order of importance, but rather the terms first, second, etc. are used to distinguish one element from another. Furthermore, the use of the terms a, an, etc. do not denote a limitation of quantity, but rather denote the presence of at least one of the referenced items.

We claim:
1. A fuel cell stack assembly comprising:
   a fuel cell stack including a plurality of fuel cell cassettes coupled together by a joining material;
   an oxidant supply blower pneumatically coupled to a cathode manifold of said fuel cell stack and configured to provide an oxidant to the fuel cell stack via the cathode manifold, wherein the oxidant exerts a cathode manifold pressure;

a load distribution plate located intermediate to said fuel cell stack and a spring strap coupled to said fuel cell stack in a manner effective for the spring strap to apply a first compressive force to said fuel cell stack via the load distribution plate, said load distribution plate defining a cavity intermediate the spring strap and the fuel cell stack and configured to receive oxidant provided by an oxidant supply blower that also supplies oxidant to the fuel cell stack, wherein a cavity pressure is dependent upon an oxidant pressure; and a deformable diaphragm intermediate the cavity and the fuel cell stack, configured to enclose the cavity, and further configured to apply a second compressive force to said fuel cell stack, wherein the second compressive force is dependent on the cavity pressure and wherein the load distribution plate is provided with a contact surface to which a spring portion of the spring strap may conform thereby generating the first compressive force, said load distribution plate configured to distribute the first compressive force over the fuel cell stack in a manner effective to normalize the first compressive force on a joining material coupling a plurality of fuel cells within said fuel cell stack.

2. The fuel cell stack assembly of claim 1, wherein the cavity pressure is proportional to a cathode manifold pressure.

3. The fuel cell stack assembly of claim 1, wherein the cavity pressure is proportional to an oxidant supply blower pressure.

4. The fuel cell stack assembly of claim 1, wherein a spring portion of said spring strap is in contact with a curved contact surface of said load distribution plate, wherein said spring portion exhibits bending stress.

5. The fuel cell stack assembly of claim 4, wherein a shape of the curved contact surface is selected so that the spring portion exhibits substantially uniform bending stress.

6. The fuel cell stack assembly of claim 4, wherein the spring portion is substantially flat before said spring strap is coupled to an end plate.

7. The fuel cell stack assembly of claim 4, wherein the spring portion conforms to a curved surface of said load distribution plate when said spring strap is coupled to an end plate.

8. The fuel cell stack assembly of claim 7, further comprising a support structure configured to support said diaphragm when said diaphragm is in a relaxed state.

9. The fuel cell stack assembly of claim 7, wherein said diaphragm is hermetically sealed to said load distribution plate.

10. The fuel cell stack assembly of claim 1, wherein said diaphragm is metallically bonded to said load distribution plate.

11. The fuel cell stack assembly of claim 1, wherein said diaphragm has a reduced bending strength at fuel cell operating temperature and is configured to conform to the top of the fuel cell stack thus applying the second compressive force over said fuel cell stack in a manner effective to normalize the second compressive force on the joining material.

12. The fuel cell stack assembly of claim 1, wherein said diaphragm is formed of sheet metal.

13. The fuel cell stack assembly of claim 1, wherein said spring strap is configured to be rigidly coupled to an end plate.

* * * * *